US009189353B2

(12) United States Patent
Guo

(10) Patent No.: US 9,189,353 B2
(45) Date of Patent: Nov. 17, 2015

(54) VOLTAGE TESTING DEVICE AND VOLTAGE TESTING METHOD FOR CPU

(71) Applicant: ShenZhen Goldsun Network Intelligence Technology Co., Ltd., Shenzhen (CN)

(72) Inventor: Li-Wen Guo, Shenzhen (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 160 days.

(21) Appl. No.: 14/058,961

(22) Filed: Oct. 21, 2013

(65) Prior Publication Data

US 2014/0218066 A1    Aug. 7, 2014

(30) Foreign Application Priority Data

Feb. 4, 2013    (CN) .......................... 2013 1 0042057

(51) Int. Cl.
*G01R 31/00* (2006.01)
*G06F 11/24* (2006.01)
*G06F 1/28* (2006.01)

(52) U.S. Cl.
CPC . *G06F 11/24* (2013.01); *G06F 1/28* (2013.01)

(58) Field of Classification Search
CPC .. G01R 31/40; G01R 31/362; G01R 31/3624; G06F 1/28; G06F 1/26; G06F 11/261; G06F 11/273; G06F 11/277; G06F 11/26

USPC .............. 324/500, 522, 527, 762.01, 764.01; 714/25, 36, 37, 31
See application file for complete search history.

(56) References Cited

U.S. PATENT DOCUMENTS

| | | | |
|---|---|---|---|
| 2013/0055024 A1* | 2/2013 | Fu et al. .......................... | 714/30 |
| 2014/0215273 A1* | 7/2014 | Yu .................................. | 714/37 |
| 2014/0266750 A1* | 9/2014 | Yu ................................. | 340/644 |

* cited by examiner

*Primary Examiner* — Son Le
(74) *Attorney, Agent, or Firm* — Novak Druce Connolly Bove + Quigg LLP

(57) ABSTRACT

The disclosure provides a voltage testing device and a method. A voltage testing device includes a PCB, a computer, and a detecting chip. The PCB includes a CPU socket, a signal producing chip, and a voltage regulator. The computer sets predetermined data. The detecting chip is inserted in the CPU socket. The detecting chip includes a reading module, a converting module, a sending module, and a control module. The signal producing chip sends a start-up signal to the control module. The converting module converts the predetermined data to SVID data. The sending module sends the SVID data to the voltage regulator. The voltage regulator sends a CPU voltage to the CPU socket. The voltage value testing device calculates a value of the CPU voltage to determine if the value of the CPU voltage associates with a voltage corresponding to the predetermined data.

10 Claims, 2 Drawing Sheets

VOLTAGE TESTING DEVICE AND VOLTAGE TESTING METHOD FOR CPU

BACKGROUND

1. Technical Field

The present disclosure generally relates to a voltage testing device and a voltage testing method for a central processing unit (CPU).

2. Description of Related Art

A CPU of a server sends a subsystem vendor ID (SVID) data to a voltage regulator when the server is powered on. The voltage regulator sends a voltage to the inner core of the CPU to supply power for the inner core according to the SVID data. However, when there is something wrong with the voltage regulator there may be high value voltage sent to the inner core that burns out the CPU.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
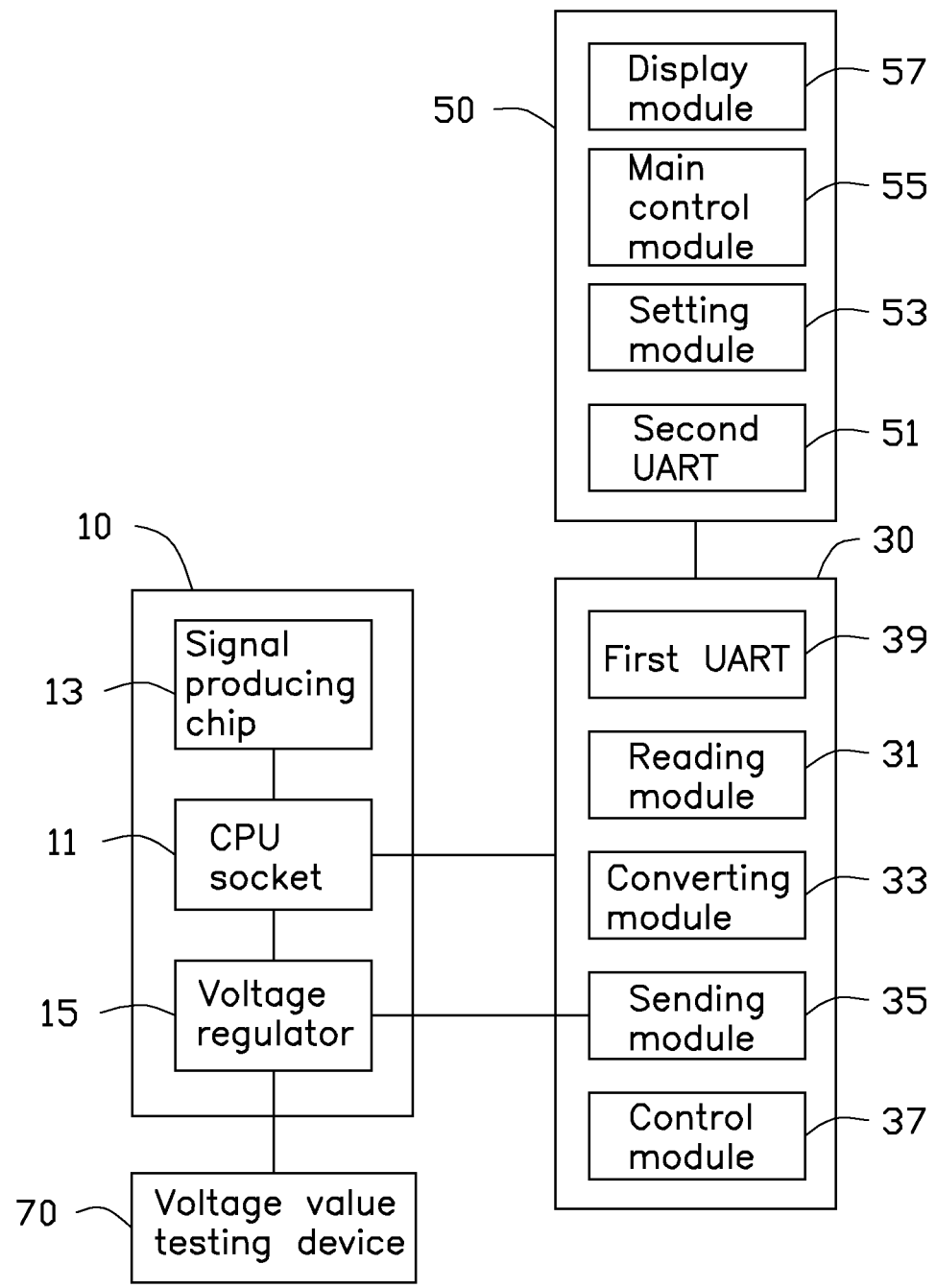
FIG. 1 is a schematic view of one embodiment of a voltage testing device.

FIG. 1 shows a voltage testing device according to one embodiment. The voltage testing device includes a printed circuit board 10. The printed circuit board 10 includes a CPU socket 11, a signal producing chip 13 connected to the CPU socket 11, and a voltage regulator 15 connected to the CPU socket 11. The voltage testing device further includes a detecting chip 30 inserted in the CPU socket 11 and a computer 50 connected to the detecting chip 30. The voltage testing device further includes a voltage value testing device 70 for calculating the voltage value of the voltage output from the voltage regulator 15 to the CPU socket 11. In one embodiment, the signal producing chip 13 is a south bridge chip, and the voltage testing device 70 is an oscillograph.

The detecting chip 30 includes a reading module 31 connected to the computer 50, a converting module 33 connected to the reading module 31, a sending module 35 connected to the converting module 33, a control module 37 connected to the reading module 31, a first universal asynchronous receiver/transmitter (UART) 39 connected to the reading module 31. The sending module 35 is connected to the voltage regulator 15.

The computer 50 includes a second UART 51, a setting module 53, a main control module 55, and a display module 57. The second UART 51 is connected to the first UART 39. The setting module 53 is configured to set predetermined data. In the illustrated embodiment, the predetermined data is 8 bit binary data, such as 10000001.

The signal producing chip 13 of the printed circuit board 10 sends a start-up signal to the control module 37 when the printed circuit board 10 is triggered to be powered on. The control module 37 of the detecting chip 30 controls the reading module 31 to read the predetermined data of the computer 50 and sends the predetermined data to the converting module 33. The converting module 33 converts the predetermined data to SVID data according to the SVID bus protocol and sends the SVID data to the voltage regulator 15. The voltage regulator 15 sends a CPU voltage to the CPU socket 11 according to the SVID data. The control module 37 of the detecting chip 30 sends a failure signal to the main control module 55 of the computer 50 if the detecting chip 30 does not receive the CPU voltage. The main control module 55 sends the failure signal to the display module 57. The voltage value testing device 70 calculates the value of the CPU voltage. If the value of the CPU voltage associates with the voltage corresponding to the predetermined data, the detecting chip 30 can be replaced with a CPU for the server to be powered on normally. If not, the CPU voltage is determined to be abnormal.

Figure 2:
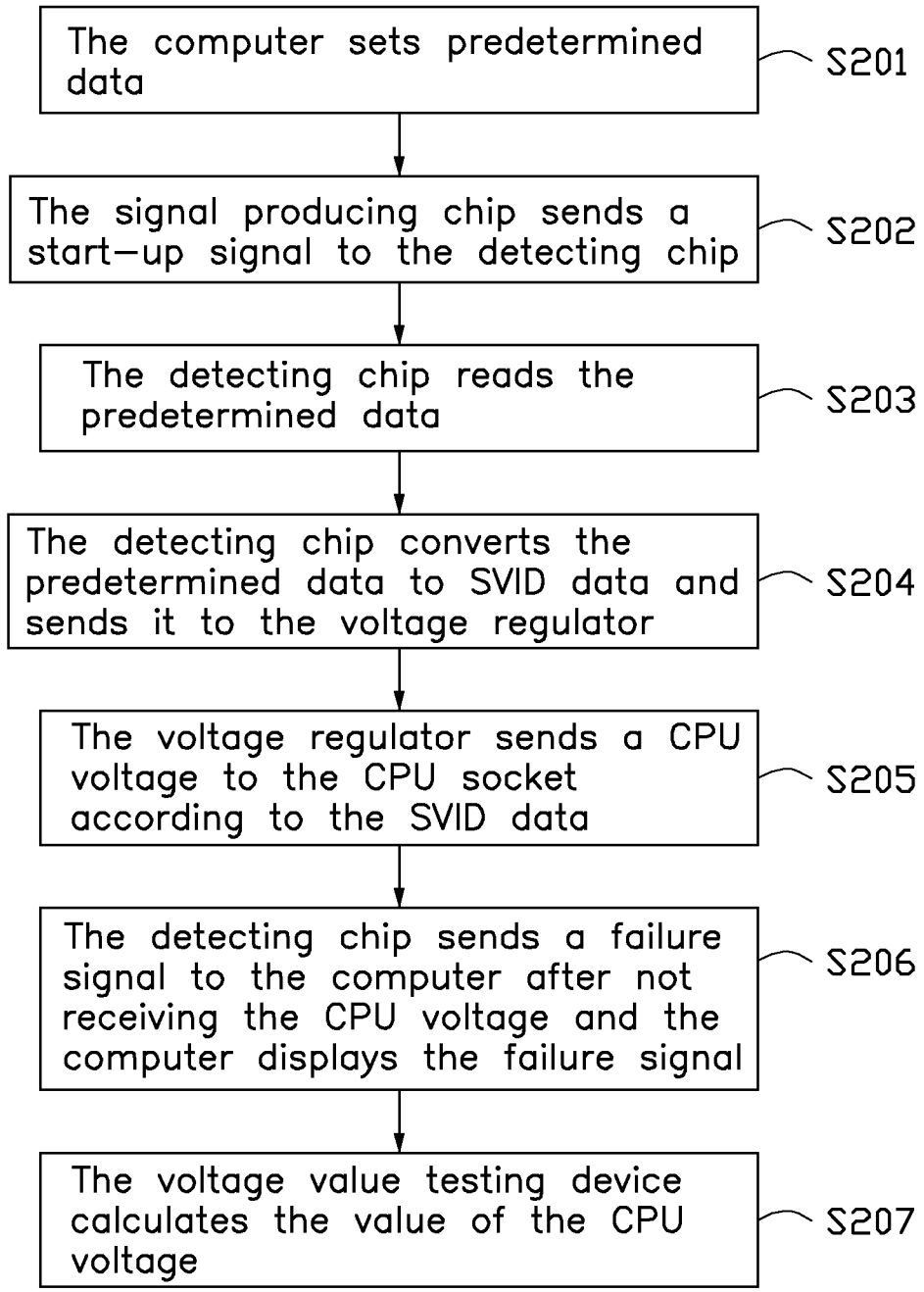
FIG. 2 is a flow chart of one embodiment of a voltage testing method.

FIG. 2 shows that a voltage testing method includes following steps.

S201, the setting module 53 of the computer 50 sets a predetermined data.

S202, the signal producing chip 13 sends a start-up signal to the control module 37 of the detecting chip 30 when the printed circuit board 10 is triggered to power on.

S203, the control module 37 controls the reading module 31 to read the predetermined data of the computer 50 and sends the predetermined data to the converting module 33.

S204, the converting module 33 converts the predetermined data to SVID data according to the SVID bus protocol and sends the SVID data to the voltage regulator 15.

S205, the voltage regulator 15 sends a CPU voltage to the CPU socket 11 according to the SVID data.

S206, the control module 37 sends a failure signal to the main control module 55 of the computer 50 if the detecting chip 30 does not receive the CPU voltage and the main control module 55 sends to the failure signal to the display module 57 to display.

S207, the voltage value testing device 70 calculates the value of the CPU voltage to determine if the value of the CPU voltage associates with the voltage corresponding to the predetermined data.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A voltage testing device comprising:
   a printed circuit board, the printed circuit board comprises a CPU socket, a signal producing chip is connected to the CPU socket, and a voltage regulator is connected to the CPU socket;
   a voltage value testing device;
   a computer, the computer comprises a setting module, a main control module, and a display module; the setting module is configured to set predetermined data; and
   a detecting chip, the detecting chip is inserted in the CPU socket; and the detecting chip comprises a reading module connected to the computer, a converting module, a sending module, and a control module;

wherein the signal producing chip is configured to send a start-up signal to the control module after the printed circuit board is triggered to be powered on; the control module is configured to control the reading module to read the predetermined data; the converting module is configured to covert the predetermined data to a subsystem vendor ID (SVID) data; the sending module is configured to send the SVID data to the voltage regulator; the voltage regulator is configured to send a CPU voltage to the CPU socket according to the SVID data; the voltage value testing device is configured to calculate a value of the CPU voltage to determine if the value of the CPU voltage associates with a voltage corresponding to the predetermined data; the control module is configured to send a failure signal to the main control module after the detecting chip does not receive the CPU voltage; and the main control module is configured to display the failure signal on the display module.

2. The voltage testing device of claim 1, wherein the predetermined data is 8 bit binary data.

3. The voltage testing device of claim 1, wherein the signal producing chip is a south bridge chip.

4. The voltage testing device of claim 1, wherein the voltage value testing device is an oscillograph.

5. The voltage testing device of claim 1, wherein the detecting chip further comprises a first universal asynchronous receiver/transmitter (UART), and the computer further comprises a second UART connected to the first UART.

6. A voltage testing method comprising:
providing a voltage testing device, the voltage testing device comprises a printed circuit board, a voltage value testing device, a computer, a detecting chip connected to the computer; and the printed circuit board comprises a CPU socket, a signal producing chip, and a voltage regulator connected to the CPU socket;

setting a predetermined data by the computer;

sending a start-up signal to the detecting chip by the signal producing chip after the printed circuit board is triggered to be powered on;

converting the predetermined data to a subsystem vendor ID (SVID) data and sending the SVID data to the voltage regulator by the detecting chip;

sending a CPU voltage to the CPU socket according to the SVID data by the voltage regulator;

calculating a value of the CPU voltage by the voltage value testing device to determine if the value of the CPU voltage associates with a voltage corresponding to the predetermined data; and sending a failure signal by the detecting chip to the computer to display the failure signal after the detecting chip does not receive the CPU voltage.

7. The voltage testing method of claim 6, wherein the predetermined data is 8 bit binary data.

8. The voltage testing method of claim 6, wherein the signal producing chip is a south bridge chip.

9. The voltage testing method of claim 6, wherein the voltage value testing device is an oscillograph.

10. The voltage testing method of claim 6, wherein the detecting chip further comprises a first universal asynchronous receiver/transmitter (UART), and the computer further comprises a second UART connected to the first UART.

* * * * *